March 14, 1933. E. B. TRACY 1,901,361
SAFETY DEVICE FOR MOTOR VEHICLES
Filed June 25, 1932 2 Sheets-Sheet 1
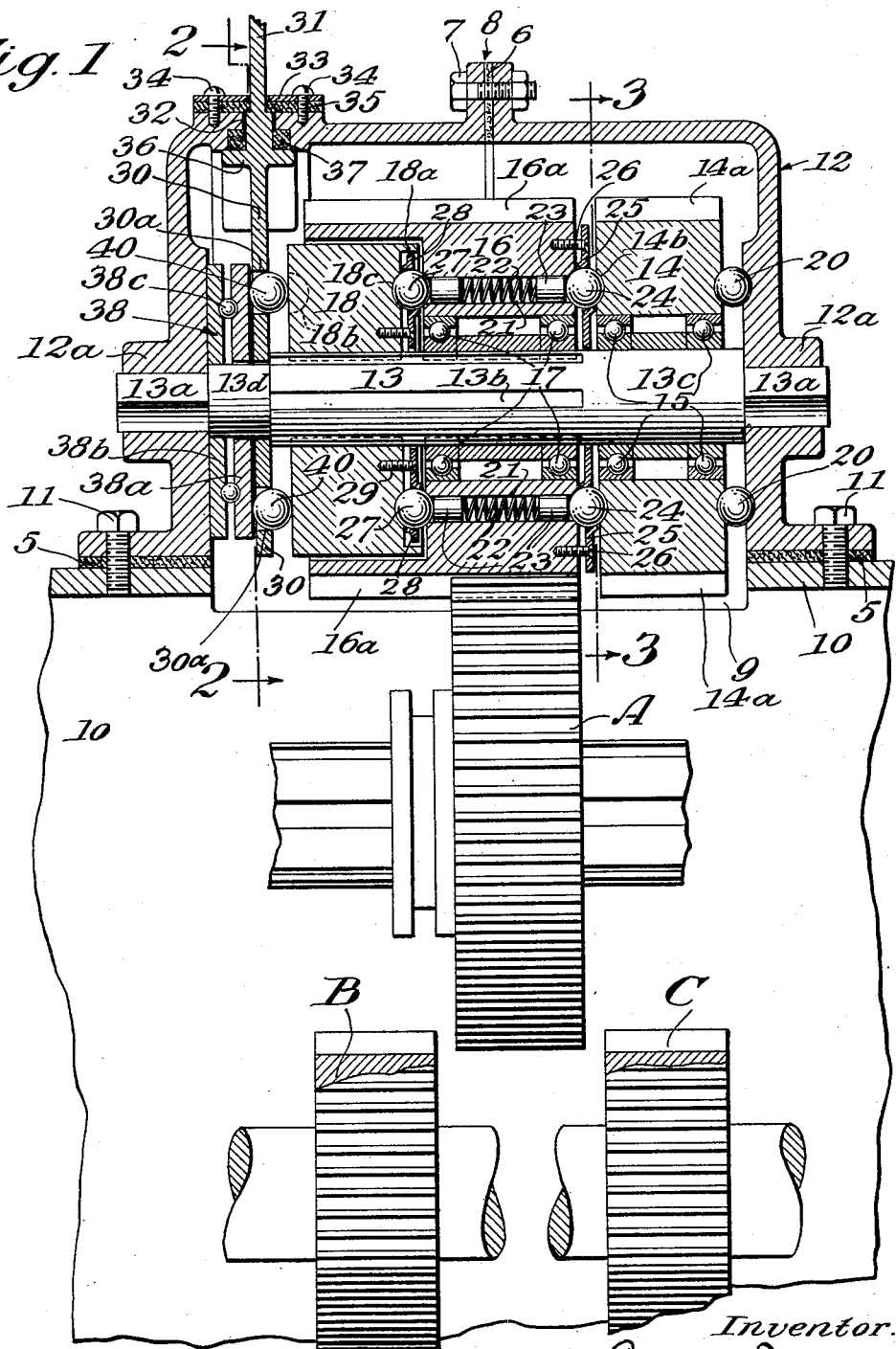

March 14, 1933. E. B. TRACY 1,901,361
SAFETY DEVICE FOR MOTOR VEHICLES
Filed June 25, 1932  2 Sheets-Sheet 2
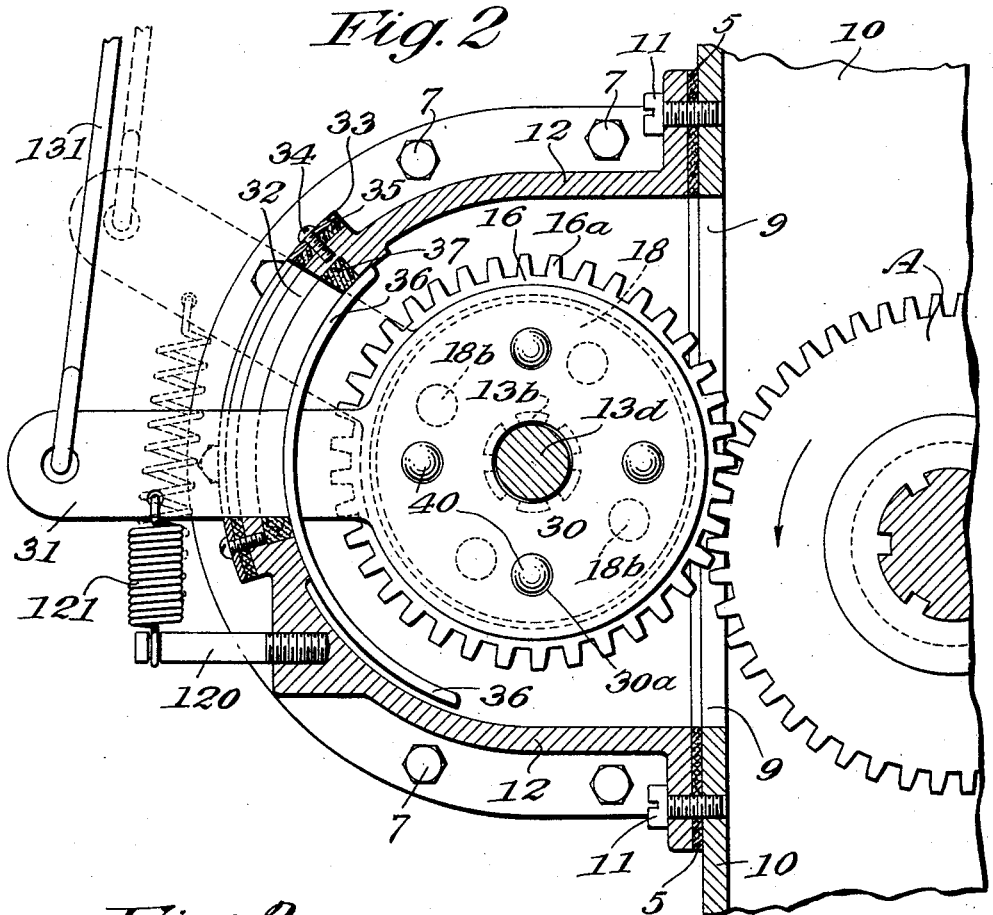
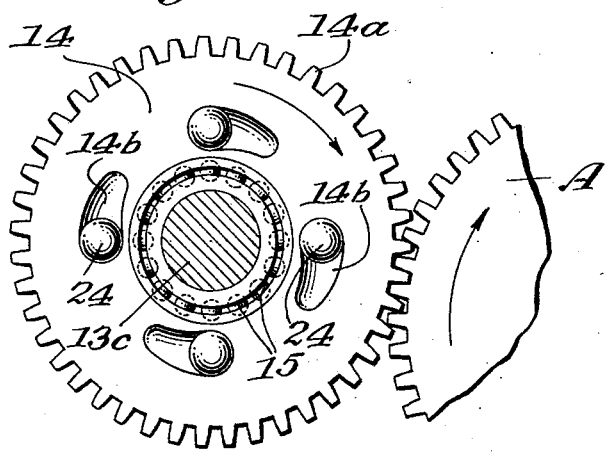
Inventor:
Elwyn B. Tracy.
By MacLeod, Calvert, Copeland & Dike,
Attorneys.

Patented Mar. 14, 1933

1,901,361

UNITED STATES PATENT OFFICE

ELWYN B. TRACY, OF LITTLETON, MASSACHUSETTS, ASSIGNOR OF ONE-HALF TO THE MACALLEN COMPANY, OF BOSTON, MASSACHUSETTS, A CORPORATION OF MASSACHUSETTS

SAFETY DEVICE FOR MOTOR VEHICLES

Application filed June 25, 1932. Serial No. 619,257.

This invention relates to safety devices for motor vehicles and more particularly to a device adapted to be built into or attached as an adjunct to an automobile transmission to prevent the accidental or unauthorized movement or drifting of the automobile in either a forward or backward direction. More particularly, the invention relates to means for releasing the safety device when it is desired to propel the vehicle to which it is attached.

One of the objects of the invention is to provide a device of the foregoing character which is relatively simple to manufacture and install, and one that can be made at a relatively low manufacturing cost. Another object of the invention is to provide a device of the foregoing character which is capable of being built into the transmission unit during manufacture, or which can be applied as an addition to a standard transmission without requiring any reorganization of the parts of the transmission. A further object of the invention is to provide releasing means which are under the control of the operator to render the safety device inoperative when it is desired to propel the vehicle either in a forward or backward direction; another object being to provide means whereby the turning force applied to the transmission gears by the attempted movement or drifting of the vehicle is utilized to assist the manually controlled releasing mechanism when desired.

Other objects of the invention will appear from the following description and appended claims when taken in conjunction with the accompanying drawings forming a part of this specification.

In said drawings:

Fig. 1 is a plan view of a portion of a conventional transmission, showing in section one embodiment of my invention applied thereto.

Fig. 2 is a vertical section taken substantially along the line 2—2 of Fig. 1.

Fig. 3 is a partial vertical sectional view taken substantially along the line 3—3 of Fig. 1.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

*The conventional transmission*

Referring particularly to the drawings, 10 designates a transmission housing containing the gears and supporting shafts of a selective type of transmission which includes a low and reverse sliding gear A, a low speed gear B, and a reverse speed gear C. Since the transmission per se forms no part of the present invention, it is not thought necessary to illustrate or describe it more in detail.

*The automatic safety device*

Fastened to the transmission housing in any suitable manner, as by means of bolts or cap screws 11, is a casing 12 containing the safety device of my invention. As shown, the casing 12 is secured to the transmission housing on the left side with respect to the front of the vehicle and in addition to supporting the safety mechanism, serves as a closure for the opening 9 formed in the transmission housing. Mounted in bosses 12a formed on the end walls of the casing, is a fixed or non-rotatable shaft, shown as a whole at 13. It will be seen that this shaft has square or non-circular end portions 13a which fit in corresponding openings or sockets in the bosses.

Any desired form of casing construction may be employed. As shown, the casing is split at 8 and the flanges of the casing sections are secured together by means of bolts or the like 7. A strip of packing 6 of any desired material is clamped between the flanges to make a tight joint. The whole casing 12, as previously described, is held by means of bolts 11 to the transmission housing. To ensure a tight joint, packing material 5 of any suitable kind is employed.

Referring particularly to Fig. 1, the shaft 13 has a splined section 13b and a plain cylindrical section 13c. The shaft has also a reduced cylindrical section 13d adjacent the left end wall of the casing 12. The safety mechanism of my invention comprises a rotatable block or gear 14 having external teeth 14a which are adapted to mesh at times with the teeth on the low and reverse sliding gear A, i. e. when said gear is in mesh with the reverse speed gear C of the transmission. A pair of ball bearings 15 is mounted upon the section 13c of the shaft and interposed between the shaft and the gear 14 to permit the gear to rotate freely on said shaft.

Mounted upon the splined portion 13b of the shaft, adjacent the gear 14, is a second block or gear member 16 having external teeth 16a which are adapted to mesh with the teeth of the gear A, when said gear is in either a neutral or low speed position. It will be noted that the member 16 is hollowed out toward the left of Fig. 1 to receive, in telescoping relation, a non-rotatable block or member 18, also mounted on the shaft 13. It will be seen also that the toothed portion of the gear 16 is substantially double the width or thickness of the gear A. Interposed between the body of the gear 16 and the splined portion of the shaft 13b, is a pair of ball bearings 17, the inner members of which races are grooved to fit the corresponding splines on the shaft section. This construction permits the body 16 of the gear to be rotated freely around the shaft, and also permits it, together with the bearings 17, to be shifted longitudinally or axially on the shaft, but prevents rotation of the inner members of the bearings relative to the shaft.

The member 18 is provided with internal grooves or slots to fit the splined shaft section and therefore, can be shifted longitudinally upon the shaft but cannot rotate relative to the shaft. The inner or right hand face of the member 18 is hollowed out slightly to provide an annular flange or projection at 18a. This face is also provided with a series of cam slots or depressions 18c, whereas the outer, or left hand face is provided with cam slots or depressions 18b.

Interposed between the member 14 and the end wall of the casing is a thrust bearing, which, as shown, comprises a series of balls 20, the adjacent faces of the casing and member 14 being provided with grooves or raceways to receive the balls. The inner, or left hand face of the member or gear 14 is provided with a series of cam slots or depressions 14b (see Fig. 3) for a purpose to be hereinafter described. The body of the gear 16 is drilled out at 21 to provide cylindrical bores which contain compression springs 22, engaging at their opposite ends slidable plugs or members 23. Four such drilled bores are preferably provided although any desired number may be employed. Located in the space between the members 14 and 16 is a ball retainer or plate 25 having sockets or openings to receive and support ball bearings 24 (four such ball bearings being shown) which are adapted to engage in the cam slots 14b. The plate 25 is held in place by screws 26. A ball bearing retainer or plate 28, similar to the retainer 25 but of smaller diameter, and having a series of spaced openings or sockets for receiving and supporting ball bearings 27, is located between the members 16 and 18, being preferably positioned in the hollowed out space formed in the inner face of the member 18 inside the flange 18a. The plate 28 is secured to the face of the member 18 by screws 29. One purpose of the springs 22 and sliding blocks 23 is to exert a pressure upon the balls 24 on the one hand and the balls 27 on the other hand and retain these balls in their respective cam slots or depressions 14b and 18c. The position of the slots 18c is reversed with respect to the slots 14b (Fig. 3). The parts 25 and 28 and their associated springs, plugs and cam slots provide, in effect, ratchets or clutch devices between the relatively movable members 14, 16 and 18. The function and operation of these balls and cam slots will be described fully below.

*The releasing mechanism*

The releasing mechanism of my invention will now be described. As shown, such mechanism comprises, preferably, an annular plate or disc 30 having a projecting arm portion 31 which extends through a slot 32 in the casing, and a corresponding slot formed in a closure plate or cap 33 which is held in place upon the casing by screws 34. A packing or washer 35 of any suitable material, such as felt or the like is held in place between the casing and the cover plate by the screws 34 to prevent leakage of oil from the transmission and safety device. To guard further against the escape of oil, the arm 31 is provided with an integral plate or arcuate portion 36 which conforms to the shape of the inner wall of the casing 12 and serves as an inner closure for the slot in all positions of the arm 31. A strip of packing 37, such as felt or the like may be located within a recess formed in the casing wall. This packing engages and is compressed by the segmental portion 36 to serve as additional means for preventing the escape of lubricant from the casing. It will be understood that the arm 31 has a limited range of movement in the slots as best shown in Fig. 2. The plate 30 is centrally apertured and is mounted upon the reduced cylindrical portion 13d of the shaft with a rotative fit. Interposed between the plate 30 and the left end wall of the casing is a bearing 38 comprising, preferably, spaced plates 38a, 38b, with interposed ball bearings 38c (Fig. 1). The plate 30 has a series of holes or openings 30a, four in number being shown, which are adapted to receive a corresponding number of ball bearings 40. The ball bearings 40 engage the inner plate 38a of the ball race and as best shown in Fig. 2, are in contact with the outer face of the member 18, thereby holding the parts 18, 16 and 14 and their interposed clutch devices in cooperative or locked relation so as to function as a safety device during any attempted unauthorized movement of the vehicle. When, however, the arm 31 is moved from the full line to the broken line position, the balls 40 are brought into register with the slots or depressions 18b and the force applied to the teeth of either of the members 14 or 16 by the gear A tends to slide the members 16 and 18 axially on the shaft 13, releasing the balls 27 and 24 of the retainers 28 and 25. The springs 22 and plugs 23 also tend to separate the parts. This separation of the parts automatically releases the locking mechanism or clutch devices and permits shifting of the transmission gears in the usual manner. An arm or bracket 120 is connected with the casing 12 and supports one end of a coil spring 121. The other end of the spring is connected with the arm 31, and as shown in Fig. 2, urges the return of the arm 31 to its full line position, thereby locking the parts of the safety device together, after the arm has been released. A cable or any suitable connection such as the flexible wire 131 serves to connect the arm 31 with the foot brake (not shown) or any other instrumentality mounted within the body of the vehicle and accessible to the operator.

*The operation of the safety device*

With the parts in their positions as shown in Fig. 1 the safety device is in operative relation with the sliding gear A of the transmission which gear is in a neutral position, it being noted that the right hand section or portion of the teeth 16a of the gear 16 is in mesh with the teeth of the gear A, the arm 31 of the releasing device or plate 30 being in its locking position as shown by full lines in Fig. 2. When the gear A is shifted to the left to connect or intermesh the low speed gear B with the left hand portion or section of the teeth of the safety gear 16, said gear will be rotated together with the gears A and B when the vehicle is being driven in low speed. If, however, the vehicle is on an upward incline and the engine stalls, the natural tendency is for the car to drift backward. With my improved safety mechanism this is prevented since any reverse rotation of the gear A in a clockwise direction, rotates the safety gear 16 in a counter-clockwise direction and wedges the balls 27 in the shallow or narrow portions of the cam slots 18c of the non-rotatable member 18, thus locking the parts and preventing further rotation of the gear A, to stop the vehicle. While I have not shown a complete transmission, it will be understood that the operation just described with respect to the low speed position applies as well to both the second and high forward speed positions. After the engine has been started, it is, of course, desirable to release the locking means so that the gears of the transmission can be shifted. This is effected by a slight pressure on the foot brake, which shifts the arm 31 and causes the balls 40 to register with the slots 18b, relieving the pressure on the parts of the safety device, whereupon the members 16 and 18 are allowed to shift axially on the shaft 13 and release the locking members or clutch devices. Upon releasing the foot brake, the spring 121 returns the arm 31 to its original position, whereupon the parts again assume their positions as shown in Fig. 1, with the safety device locking mechanism in operative position.

My improved safety mechanism functions also to prevent unauthorized movement of the vehicle when the slidable gear A is in a neutral position since in this position, the teeth of said gear are in mesh with the teeth on the right hand portion or section of the safety gear 16. To release the parts after any such unauthorized movement, the clutch devices are released in the manner as above described, to permit shifting of the gears.

When the shiftable gear A is moved toward the right of Fig. 1 to mesh with the safety gear 14 and the reverse speed gear C, any counter-clockwise rotation of the gear A causes the safety gear 14 to rotate in a clockwise direction. As long as the gear 14 is rotated in this direction the safety device, i. e. the clutch or locking mechanism, located between members 14 and 16 does not function. If, however, the vehicle has a tendency to move in a forward direction while the gears are in the reverse drive position, the clockwise rotation of the gear A will cause the safety gear 14 to rotate in a counter-clockwise direction whereupon the clutch devices 26 and 28 and the non-rotatable member 18 will function to effect a locking together of the parts to prevent such unauthorized movement. When now it is desired to propel the vehicle under its own motive power, the brake pedal is depressed to shift the arm 31 to the broken line position, causing the balls 40 to register with the depressions or grooves 18b permitting the members 16 and 18 to shift axially on the shaft 13 and release the locking mechanism. When the foot pedal is released, the spring 121 returns the arm 31 to its original position which will force the members 18 and 26 to the right, axially of the shaft, and relock the clutch members, as previously described.

From the foregoing it will be understood that I have provided a new and improved safety device for a motor vehicle which prevents, automatically, unauthorized movement of the vehicle whether the transmission gears are in neutral position, any one of the forward speed positions, or in reverse. Various devices for preventing back drift and forward unauthorized movement of motor vehicles have been patented, some of which have been placed upon the market. Considerable difficulty, however, has been encountered with these devices inasmuch as the locking means would become jammed and locked when functioning to prevent unauthorized movement, and in some cases, it has been impossible to release the locking mechanism so that the vehicle could be propelled when desired without dismantling the mechanism. I have solved this problem completely by my novel arrangement of parts, whereby the turning force applied to the gears of the safety device through the transmission gearing by the attempted movement or drifting of the vehicle is utilized to assist in the release of the locking mechanism, which is accomplished by simply manipulating my improved releasing mechanism to permit the axial movement or separation of the members of the safety device on their supporting shaft. This is done by depressing the foot brake or any suitable pedal or lever located within reach of the driver, to which the releasing mechanism is connected.

I claim:

1. In combination with the power transmission and gear shift mechanism of an automobile, of a safety device for preventing unauthorized movement of the vehicle, comprising a casing attached to the transmission housing, a fixed shaft within the casing, rotatable gears mounted on the shaft and adapted to be intermeshed with a sliding gear of the transmission, a non-rotatable member cooperating with one of said gears, clutch devices, one interposed between said gears and the other between one of said gears and said non-rotatable member to lock the parts together, and a releasing device mounted on the shaft and cooperating with said non-rotatable member to maintain said member and said gears in cooperative relation, and shiftable to permit axial separation of the gears and non-rotatable member to release the clutch devices.

2. In combination with the power transmission and gear shift mechanism of an automobile, of a safety device for preventing unauthorized movement of the vehicle, comprising a casing attached to the transmission housing, a fixed shaft within the casing, rotatable members and a non-rotatable member mounted upon said shaft in cooperative relation, said rotatable members being adapted to be driven by one of the members of the transmission, clutch devices carried by the shaft and located between said members to lock the members together, and a releasing device also carried by said shaft for maintaining said members and clutch devices in locked relation and shiftable to permit separation of the members axially of the shaft to release the clutch devices.

3. In combination with the power transmission and gear shift mechanism of an automobile, of a safety device for preventing unauthorized movement of the vehicle, comprising a casing attached to the transmission housing, a fixed shaft within the casing, a pair of rotatable members and a non-rotatable member mounted upon the said shaft in cooperative relation, said rotatable members being adapted to be driven by one of the rotatable members of the transmission, clutch devices carried by the shaft and located between said members to lock the members together, and a manually controlled releasing device also carried by said shaft for maintaining said members and clutch devices in locked relation and shiftable to permit separation of the members axially of the shaft to release the clutch devices.

4. In combination with the power transmission and gear shift mechanism of an automobile, of an automatic safety device for preventing unauthorized movement of the vehicle, comprising a casing attached to the transmission housing, a fixed shaft within the casing, rotatable gears mounted on the shaft and adapted to be selectively intermeshed with a sliding gear of the transmission, a non-rotatable member cooperating with one of said gears, a clutch device interposed between said rotatable gears, a second clutch device interposed between one of said gears and said non-rotatable member to lock the parts together, and a manually controlled releasing device mounted on the shaft and cooperating with said non-rotatable member to maintain said member, clutch devices and said gears in cooperative relation and shiftable to relieve the pressure upon and permit separation of the gears and non-rotatable member axially of the shaft to release the clutch devices.

5. In combination with the power transmission and gear shift mechanism of an automobile including a low and reverse sliding gear, of a safety device for preventing unauthorized movement of the vehicle in either direction, comprising a casing attached to the transmission housing, a non-rotatable shaft mounted within the casing, a rotatable safety gear mounted on said shaft and adapted to cooperate with said sliding gear when the latter is in the reverse speed driving position, a second safety gear rotatably mounted on said shaft, a clutch device on the shaft between said gears and cooperating therewith, said second gear having a toothed periphery of a width substantially twice as great as that of said first named safety gear, a non-rotatable member mounted on the shaft in telescopic relation with the second safety gear, a clutch device located between said member and said second gear, said clutch devices functioning to permit rotation of said gears in one direction but cooperating with said non-rotatable member to prevent the reverse rotation of said gears, and a releasing device mounted on the shaft adjacent said non-rotatable member and having means cooperating therewith to maintain the safety gears and member in cooperative locking relation and shiftable to permit the separation of said gears and member axially of the shaft to release the clutch devices and permit reverse rotation of the gears.

6. In combination with the power transmission and gear shift mechanism of an automobile including a low and reverse sliding gear, of a safety device for automatically preventing unauthorized movement of the vehicle in either direction, comprising a casing attached to the transmission housing, a non-rotatable shaft mounted within the casing, a rotatable safety gear mounted on said shaft and adapted to cooperate with said sliding gear when the latter is in the reverse speed driving position, a second safety gear rotatably mounted on said shaft, a clutch device located between said gears and cooperating therewith, said second gear having a toothed periphery of a width substantially twice as great as that of said first named safety gear, a non-rotatable member mounted on the shaft in telescopic relation with the second safety gear a clutch device located between said member and said second gear, said clutch devices functioning to permit rotation of said gears in one direction but cooperating with said non-rotatable member to prevent the reverse rotation of said gears, a manually controlled releasing device cooperating with the non-rotatable member to maintain said member and the safety gears in locked relation but shiftable to release said member and safety gears to permit them to move axially of the shaft to release the clutch devices, and means for normally maintaining said releasing device in locking position.

7. In combination with the power transmission and gear shift mechanism of an automobile, of a safety device comprising a casing attached to the transmission housing, a shaft mounted in the casing, a plurality of cooperating members mounted on said shaft, certain of said members having external gear teeth adapted to mesh with the teeth of the low and reverse sliding gear of the transmission to rotate with said gear in one direction, means for locking the members against rotation in the opposite direction, and manually controlled means shiftable to permit axial movement of the members relative to one another to release the locking means and allow rotation of the members in said opposite direction.

8. In combination with the power transmission and gear shift mechanism of an automobile, of a safety device comprising a casing attached to the transmission housing, a shaft mounted in the casing, a plurality of cooperating members mounted on said shaft, certain of said members having external gear teeth adapted to mesh with the teeth of the low and reverse sliding gear of the transmission to rotate with said gear in one direction, means for locking the members against rotation in the opposite direction, manually controlled means shiftable to permit axial movement of the members relative to one another to release the locking means and allow rotation of the members in said opposite direction, and spring means for returning the releasing means to locking position.

9. A safety device for automobiles adapted to be associated with the power transmission and gear shift mechanism of a motor vehicle, comprising a casing, a shaft within the casing, gears mounted on said shaft, certain of said gears being adapted to be engaged by one of the transmission gears to rotate therewith in one direction only, automatic means for locking the gears against rotation in the opposite direction, and means under the control of the operator for releasing the gears to permit their relative movement axially of the shaft to release the locking means and permit said gears to rotate in said opposite direction when desired.

10. A safety device for automobiles adapted to be associated with the power transmission and gear shift mechanism of a motor vehicle, comprising a casing, a shaft within the casing, gears mounted on said shaft, certain of said gears being adapted to be engaged by one of the transmission gears to rotate therewith in one direction only, automatic means for locking the gears against rotation in the opposite direction, means under the control of the operator for releasing the gears to permit their relative movement axially of the shaft to release the locking means and permit said gears to rotate in said opposite direction when desired, and means for normally maintaining the releasing means in locking position.

11. A safety device for automobiles adapted to be associated with the power transmission and gear shift mechanism of a motor vehicle, comprising a casing, a shaft located within the casing, a pair of rotatable gear members mounted on the shaft and adapted to be intermeshed with a sliding gear of the transmission to rotate with said gear in one direction only, a non-rotatable member associated with one of said gears and adapted to prevent reverse rotation of the gear, means interposed between the rotatable gears to prevent reverse rotation thereof, and manually controlled releasing means associated with said shaft and non-rotatable member to maintain the parts in cooperative relation but shiftable to permit axial movement of said member and gear to release the locking mechanism and allow reverse rotation of the gears.

12. A safety device for automobiles adapted to be associated with the power transmission and gear shift mechanism of a motor vehicle, comprising a casing, a shaft located within the casing, a pair of rotatable gear members mounted on the shaft and adapted to be intermeshed with a sliding gear of the transmission to rotate with said gear in one direction only, a non-rotatable member associated with one of said gears and adapted to prevent reverse rotation of the gear, means interposed between the rotatable gears to prevent reverse rotation thereof, manually controlled releasing means associated with said shaft and non-rotatable member to maintain the parts in cooperative relation but shiftable to permit axial movement of said member and gear to release the locking mechanism and allow reverse rotation of the gears, and a spring for returning the releasing means to locking position.

13. A safety device for automobiles adapted to be associated with the power transmission and gear shift mechanism of a motor vehicle including a low and reverse sliding gear, comprising a casing adapted to be mounted upon the transmission housing, a shaft in said casing, safety gears carried by said shaft and adapted to cooperate with said sliding gear to rotate therewith in one direction, locking devices located between said safety gears to prevent reverse rotation of said gears, means for releasing the locking devices to permit the separation of said safety gears axially on said shaft, and means whereby the turning force to which said safety gears are subjected is utilized to assist the manually controlled means to release the locking devices.

14. In combination with a power transmission and gear shift mechanism of an automobile including a low and reverse sliding gear, of a safety device for preventing unauthorized movement of the vehicle, comprising a casing adapted to be mounted upon the transmission housing, a shaft in said casing, safety gears carried by said shaft and adapted to cooperate with said sliding gear to rotate therewith in one direction, locking devices located between said safety gears to prevent reverse rotation of said gears, means for releasing the locking devices to permit the separation of said safety gears axially on said shaft, and means whereby the turning force to which said safety gears are subjected is utilized to assist the manually controlled means to release the locking devices.

In testimony whereof I affix my signature.
ELWYN B. TRACY.